United States Patent Office 2,823,692
Patented Feb. 18, 1958

2,823,692

HYDRAULIC REGULATION DEVICES

Erik Riis-Carstensen, Buffalo, N. Y.

Application February 11, 1955, Serial No. 487,688

2 Claims. (Cl. 137—154)

The invention relates to means for regulating the flow of water from a higher container to a lower container; and the object of the improvement is to prevent or limit the flow in periods when the water level in the lower container exceeds a certain predetermined elevation.

In irrigation, sewerage, drainage and water works it is frequently desirable to let water flow freely from a higher container, such as a reservoir or an open or closed channel or conduit, to another and lower container as long as the water level in the lower container does not exceed a certain elevation.

The regulation of such transfer is ordinarily effected by mechanical regulators controlled by floats or other means which cause a partial or complete closing off of the connecting channel or conduit when the surface elevation of the water in the lower container has reached the controlling level, and often the proper operation of such regulating devices depends upon constant attention to guard against mechanical failure or clogging from water carried material such as frequently is present in sewage or in surface water run-off.

The invention consists in the utilization of air to stop or limit the flow of water from the higher to the lower container by forming the connecting conduit in such a way that air becomes trapped by the rising water level in the lower container, and that siphon action will be prevented.

Figure 1:
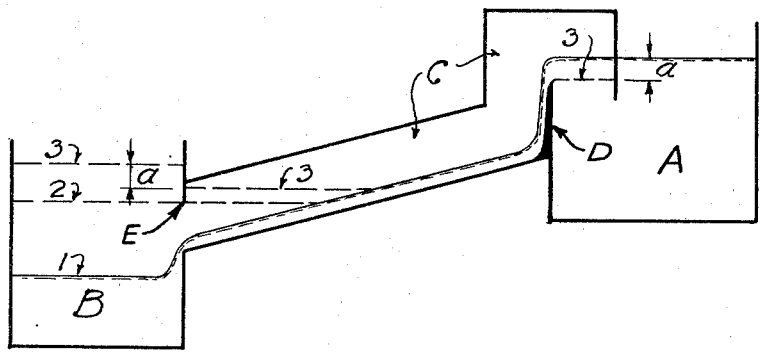

On Fig. 1 the invention is illustrated in its simplest form. The higher container A is connected with the lower container B by the conduit C in which the weir D is located.

When the water level in A is above the crest of the weir D and the water level 1 in B is below the edge of the cut-off E water will flow freely from A to B.

When rising water level in B reaches the elevation 2 of the edge of the cut-off E the air contained in C will be trapped. Continued rising water level in B will cause the air in C to be compressed and the compressed air will force the water level upstream of the weir D down, cutting off all flow from A to B when the water surface in B has reached elevation 3.

As long as the water level in B remains at elevation 3 or higher while the surface in container A does not exceed a certain maximum level, flow from A to B will be prevented until such a time when the water level in B again has been properly lowered.

When flowing water has sufficient velocity and turbulence it starts, through surface action, to carry particles of air along with it. Under certain conditions, therefore, the water flowing through the conduit C may start to remove the air trapped therein and disturb the proper functioning of the regulating device.

Figure 2:
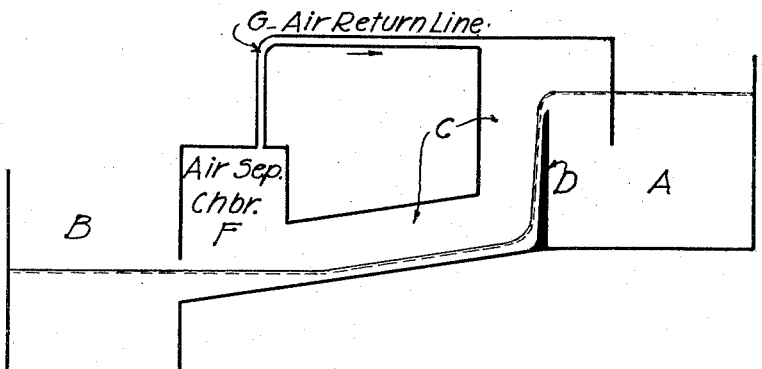

A form of the invention which prevents such disturbance is shown on Fig. 2 and the modification consists in the provision of an air separation chamber F in which the waterway cross-section is larger than in the conduit C causing the flow to become slow enough to permit air and water to separate. A special air return line G as shown on the drawing may or may not be desirable.

It may be desirable never to cut off the flow from the higher container A to the lower container B entirely, but to permit a limited amount to pass regardless of the water level in B.

Such operation procedure can be obtained by a separate connection between A and B or by the installation of a flume H of limited capacity below or through the weir D as shown on Fig. 3.

Air trapped and compressed in the connecting channel C will depress the level of the water in container A with which it is in contact the same distance as it will depress the level of water from container B.

Proper operation, therefore, does not permit the water level in the upper container to exceed a certain predetermined elevation.

Figure 3:
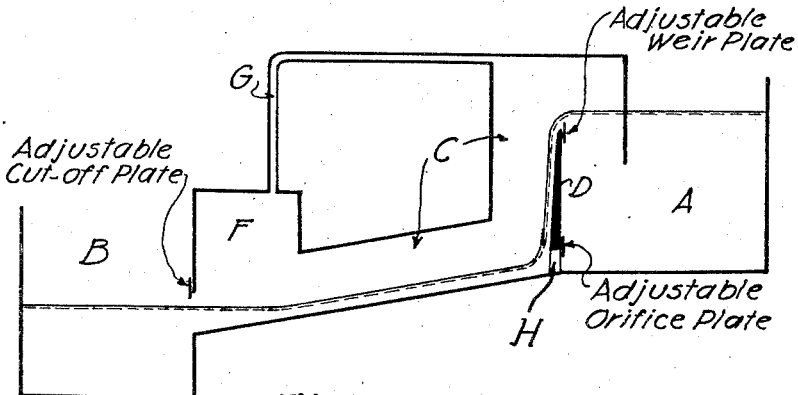

Various means for adjustments also indicated on Fig. 3 can be included or excluded as conditions may require.

The invention is not limited to the regulation of the flow of water but applies to any kind of liquid matter.

I claim:

1. A liquid flow regulating device comprising an upper container, a lower container, a connecting conduit extending from the top of the upper container to a point spaced from the top of the lower container, a downward projection extending from the ceiling of the connecting conduit at its junction with the lower container, said conduit terminating at its upper end with a downward projection which extends a substantial distance into the upper container, whereby the liquid level above the lowest ridge of the first mentioned projection seals a closed air chamber in said connecting conduit, and continued liquid flow through said conduit causes an increase in the air pressure in said conduit to the point that flow into said conduit ceases.

2. A liquid flow regulating device, as described in claim 1 including an air separation chamber forming a portion of the connecting conduit and having greater cross-sectional area than other parts of said connecting conduit causing flow through this chamber to become sufficiently slow to permit air particles absorbed by the liquid during passage through the conduit to separate from the liquid in order to prevent the forming of siphon action in the conduit.

References Cited in the file of this patent

UNITED STATES PATENTS

| 1,249,227 | Smith | Dec. 4, 1917 |

FOREIGN PATENTS

| 34,719 | Switzerland | Aug. 23, 1905 |
| 588,143 | France | May 17, 1923 |